UNITED STATES PATENT OFFICE.

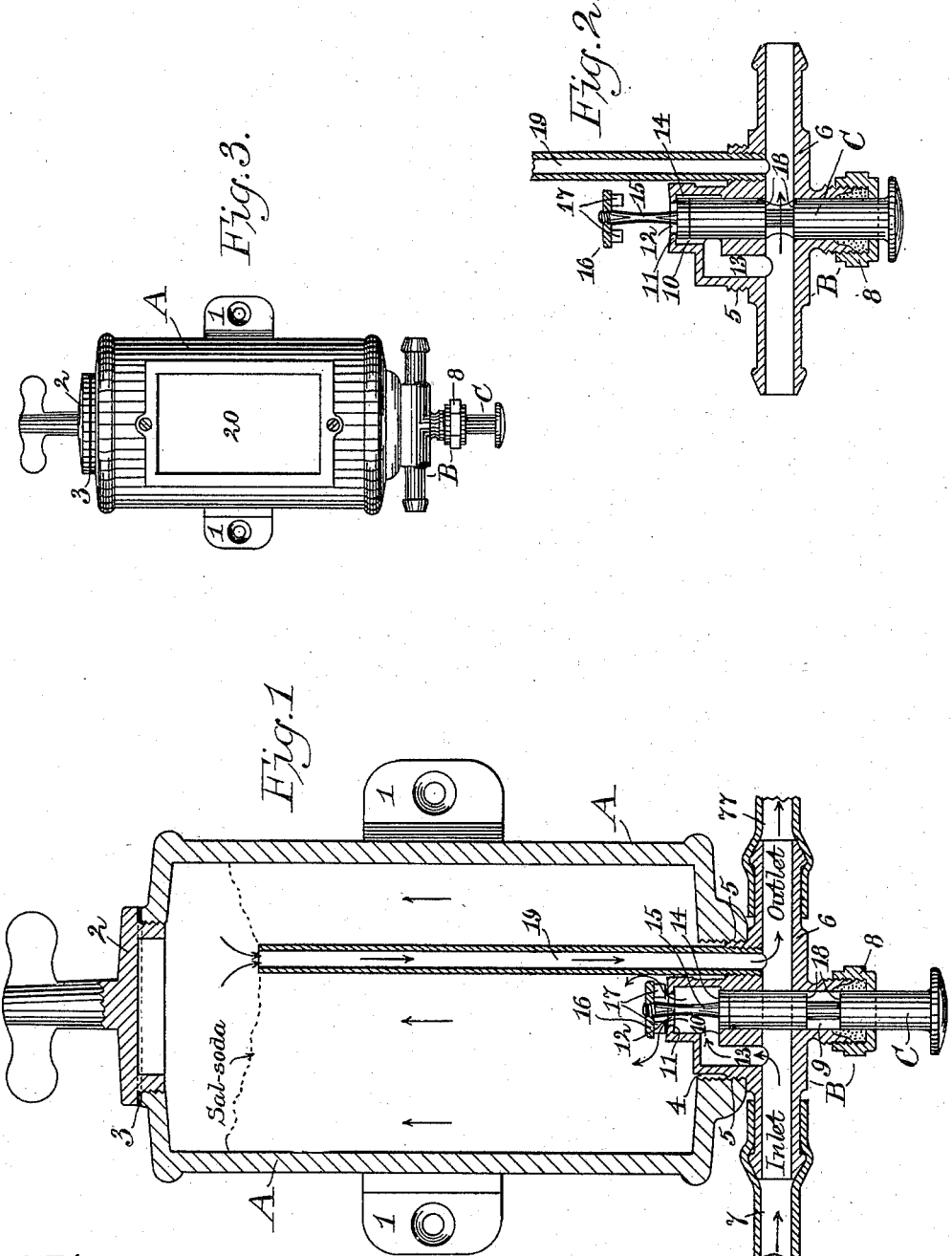

HENRY E. BAILEY, OF ALBANY, NEW YORK, ASSIGNOR OF TWO-THIRDS TO RICHARD O. BASSETT AND CHARLES H. BAILEY, OF SAME PLACE.

APPARATUS FOR CLEANING PIPES.

SPECIFICATION forming part of Letters Patent No. 580,303, dated April 6, 1897.

Application filed November 4, 1896. Serial No. 610,996. (No model.)

*To all whom it may concern:*

Be it known that I, HENRY E. BAILEY, of Albany, in the county of Albany and State of New York, have invented a new and useful Apparatus for Chemically Cleansing Pipes Used for Conveying Beer and other Malted Liquors, of which the following is a specification.

In using pipes for conveying beer, ale, and other malted liquors there is found a tendency to the formation of slime and other offensive matter that is deposited therein by the liquid from which it emanates. This deposition will soon produce a cloudy appearance and objectionable taste in the liquid that flows through the pipe.

The object of my invention is to provide an apparatus that will chemically dissolve the slime and other depositions in the pipe and then, by a flow of clear water which passes through the apparatus, thoroughly cleanse the pipe of all improper matter and restore it to a condition of purity and cleanliness.

To this end my invention consists in providing an apparatus which embraces a chamber for containing a soluble chemical, like sal-soda or other chemical of a like nature, for dissolving slime and other impurities, and a water-controlling mechanism by which a current of water may be made to flow through said chamber, thereby reducing a portion of the chemical to the form of a liquid solution which will attack the impurities deposited in the pipe and reduce them to a condition in which they will be carried from the pipe. Then by shifting the valve of the water-controlling mechanism a current of clear water can be flowed through the pipe to effect its purification by rinsing.

In the accompanying drawings, which are herein referred to and form part of this specification, Figure 1 is a vertical central section of my invention, showing the valve of the water-controlling mechanism arranged to force a current of inflowing water into the chamber for containing the chemical; Fig. 2, a vertical section of the water-controlling mechanism detached from the apparatus, showing the valve of said mechanism arranged to allow the water to flow through the apparatus without entering the chemical chamber; and Fig. 3, a front elevation of my apparatus on a reduced scale.

As represented in the drawings, A designates the chamber of my apparatus. Said chamber is provided with lugs 1, by which said chamber can be secured in a vertical position conveniently adjacent to the pipes with which it is connected. At the top of said chamber an opening is formed for the purpose of affording access to the interior of the chamber to charge it with the chemical material used therein, and a screw-plug 2 forms a closure for said opening, and a gasket 3, interposed between the shoulder of the screw-plug and the top of the chamber A, forms a water-tight joint thereat.

B is a water-controlling mechanism that is fitted to screw into an opening 4, formed in the bottom of the chamber A. Said water-controlling mechanism consists of a plug 5, which constitutes the base thereof and is fitted to screw into the opening 4. Said plug is provided with a horizontal pipe 6, whose length is preferably made to extend across the lower end of the chamber A, and whose opposite ends should be formed to receive rubber tubing, of which a tube 7 should be arranged to connect with a water-supply pipe, and another tube 77 should connect with the beer-conveying pipes. A stuffing-box 8, which depends from the middle of the horizontal pipe 6, is bored to correspond to an opening 9, that is bored centrally in the plug 5 and leads into a chamber 10, at whose upper end there is a valve-seat 11, having an opening 12, which, when the plug 5 is secured in its place, forms a communication with the interior of the chamber A. From the chamber 10 there is a passage 13, which leads into the bore of the horizontal pipe 6 at a point between the opening 9 and the inlet of said horizontal pipe.

C is a cylindrical valve or plunger that is fitted to slide in the stuffing-box 8 and in the opening 9. Said valve has a compressible seat 14, that is arranged to take against the valve-seat 11 and form a water-tight joint therewith. The upper portion of said valve is reduced in diameter to form a stem 15, to which is attached a head 16, that is provided with pendent spurs 17, which, by taking against the upper face of the plug 5, prevents the head 16 from closing the opening 12. The spaces between the spurs 17 afford ample openings to allow the water to flow into the interior of the chamber A. The body of the valve C has a circumferential groove 18 formed therein in such manner that when said valve is in its raised position, as shown in Fig. 2, the groove 18 will form a communication between the two parts of the bore of the horizontal pipe 6 and allow the water to flow through said pipe without entering the interior of the chamber A. A standing pipe 19, which is secured in the plug 5, extends nearly to the top of the interior of the chamber A, and its bore has a free communication with that of the horizontal pipe 6, between the valve C and the outlet end of the horizontal pipe. When the valve C is in the position shown in Fig. 1, the inflowing water will be forced to pass through the passage 13 into chamber 10, thence through opening 12 into the interior of the chamber A, wherein it will dissolve a portion of the chemical contained in said chamber, and the solution will flow downward through the standing pipe 19 into the bore of the horizontal pipe 6 and thence through the tube 77 into the beer-conveying pipe to dissolve slime and impurities in the latter. After the solvent liquid has flowed a sufficient time—say for a minute or a fraction more—to dissolve the impurities contained in the beer-conveying pipes the position of the valve C should be shifted to bring the groove 18 into correspondence with the bore of the horizontal pipe 6, so as to allow clear water to pass through the beer-conveying pipe and effect a thorough rinsing of the latter, thereby leaving the pipes in a perfectly clean and uncontaminated condition. After the operation just described has been accomplished the rubber tubing 7 and 77 should be removed, and while the valve C is in its depressed position the screw-plug 2 should be slackened to allow air to enter the interior of the chamber A, and the surplus liquid solvent will then be drained from the apparatus. After the rubber tubing has been disconnected the beer-conveying pipes can be connected to restore the beer-dispensing apparatus to its normal condition. It will be seen that by this construction the water cannot at any time be entirely excluded from passing through my apparatus so long as it is connected to the water-supply pipe, the passing of the water being either directly through the horizontal pipe 6 or circuitously through the inlet end of pipe 6, passage 13, and chamber 10 into the chamber A, thence downward through the standing pipe 19 to its escape through the outlet end of pipe 6.

The exterior of the casing A is preferably provided with a panel 20 for holding printed directions for using my apparatus; but as said panel does not affect the operation of the apparatus it does not form an essential part of it.

I do not broadly claim an apparatus for cleansing beer-pipes which consists of a chamber for containing an alkali, a water-supply pipe, and means for passing a current of water through the alkali or for diverting the water from the alkali-chamber so that it will pass directly through the beer-conveying pipes and effect a rinsing of the latter, as I am aware that such an apparatus has heretofore been produced; but

What I claim as my invention, and desire to secure by Letters Patent of the United States, is—

In a water-controlling mechanism for a pipe-cleansing apparatus, the combination, with a horizontal pipe, 6, a valve-opening, 9, arranged at right angles to and communicating with the bore of the pipe 6, and a valve-seat, 11, formed at the upper end of said opening and provided with an opening, 12, of a manually-operated valve, C, fitted to slide in the opening 9 and adapted to close the opening 12; said valve being provided with means whereby it can be manipulated from the exterior of the apparatus, a circumferential groove, 18, formed in said valve and adapted to coincide with the bore of the pipe 6 when said valve is at the uppermost extremity of its movement, a head, 16, attached to said valve and provided with spurs, 17, which prevent the closing of the opening 12 when said valve is at the lowest extremity of its movement, and a standing pipe, 19, arranged to communicate with the outlet end of the pipe 6, as and for the purpose specified.

HENRY E. BAILEY.

Witnesses:
RICHARD O. BASSETT,
WM. H. LOW.